R. GRINDE.
SHOVEL ATTACHMENT FOR TOBACCO CULTIVATION.
APPLICATION FILED JULY 18, 1912.
1,085,204.  Patented Jan. 27, 1914.
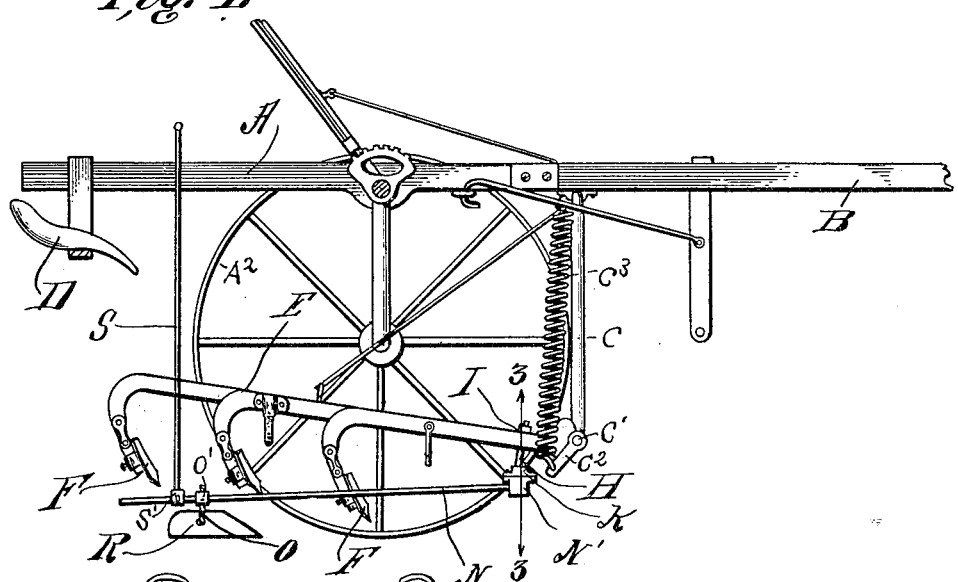
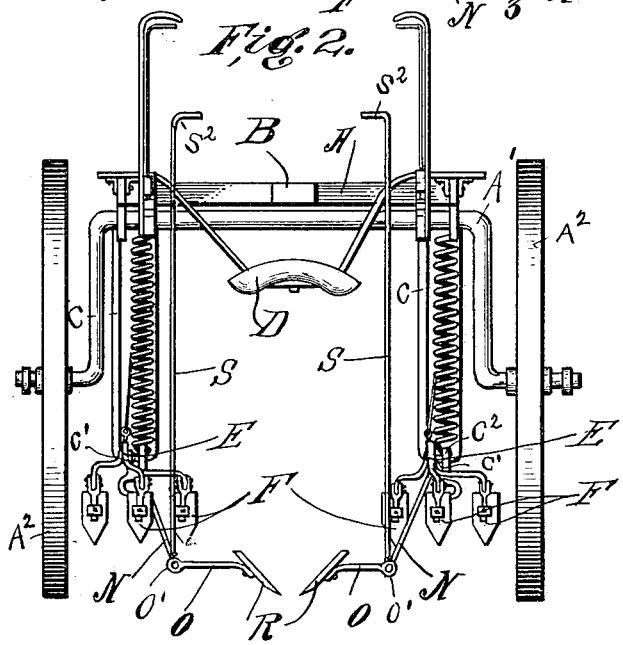
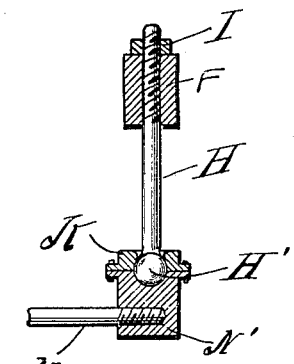
Inventor
Raymond Grinde

UNITED STATES PATENT OFFICE.

RAYMOND GRINDE, OF WAUNAKEE, WISCONSIN.

SHOVEL ATTACHMENT FOR TOBACCO CULTIVATION.

1,085,204.  Specification of Letters Patent.  Patented Jan. 27, 1914.

Application filed July 18, 1912. Serial No. 710,305.

*To all whom it may concern:*

Be it known that I, RAYMOND GRINDE, a citizen of the United States, residing at Waunakee, in the county of Dane and State of Wisconsin, have invented certain new and useful Improvements in Shovel Attachments for Tobacco Cultivation; and I do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to new and useful improvements in attachments to straddle row cultivators, especially adapting the apparatus for hoeing tobacco plants, etc.

The invention comprises various details of construction and combinations and arrangements of parts which will be hereinafter fully described, shown in the accompanying drawings and then specifically defined in the appended claim.

I illustrate my invention in the accompanying drawings, in which:—

Figure 1 is a view in elevation showing the frame of a cultivator with my invention applied thereto. Fig. 2 is a rear view, and Fig. 3 is a detail sectional view taken on line 3—3 of Fig. 1.

Reference now being had to the details of the drawings by letter, A designates the frame of an ordinary straddle row cultivator B with seat D supported upon a bar fastened at its ends to the frame. The drop axle A' has journaled thereon the wheels A². Depending from the frame are the bars C, having their lower ends bent laterally as at C' forming bearings for the crank arms C² which are journaled thereon. Coiled springs, designated by letters C³, are fastened, each at its lower end, to the arms C² and the upper end of each is fastened to the frame of the cultivator.

Cultivators F are mounted upon standards E and are arranged in series and fastened together, one beam of each series being pivotally mounted upon the laterally projecting bearing portion C' of the bars C and fastened to the crank arms C², thereby affording a resilient connection between the beams and the cultivator frame. Fastened to one beam of each series is a rod H, the upper end of which is threaded and passes through a threaded opening in the beam, as shown in Fig. 3 of the drawings, and is held by means of a nut I. The lower end of each rod H is spherical shaped as at H' and has a bearing in the two blocks K and N', which latter is provided with a threaded opening for the reception of the threaded end of the rod N; each rod N has fixed thereto a collar O' from which an arm O projects which carries a hoe R. The rods S have collars S' fixed to their lower ends and which are held by set screws upon the rods N, the upper end of each rod S having a laterally projecting handle portion S², forming means whereby the rods N may be raised or lowered, if desired, by the operator sitting upon the seat D.

By the provision of a cultivator attachment made in accordance with my invention, it will be noted that the two series of cultivator beams and also the rod supported thereby are held under tension of the springs normally in the positions shown in the drawings, the cultivators yielding when coming in contact with obstructions and, through the medium of the operating rods S, the upper ends of which are convenient to the operator upon the seat, the rods N may be raised independent of the beams by reason of the ball and socket joint intermediate the lower spherical end of the rods H and the bearing in one of which the forward ends of the rod N are mounted.

What I claim to be new is:—

In combination with the frame of a straddle row cultivator, an axle journaled in suitable bearings thereon, wheels upon the axle, a seat, bars projecting upwardly contiguous to the seat and having shanks projecting laterally from their lower ends carrying cultivator blades, cultivator beams arranged in series with the beams of each series fastened together, one beam of each series pivotally mounted upon the laterally projecting end of one of said bars, crank arms journaled one upon each lower end of said bars, and each fastened to the beam which is journaled thereon, coiled springs each fastened at its lower end to the end of a crank arm and its other end secured to the frame, a rod fastened to one beam of each series and having its lower end spherical shaped, bearing blocks in which each spherical end of the rod is journaled, a rod fastened to the lower one of said bearing blocks, a hoe fixed to each rod which is fastened to a bearing block, and means for raising and lowering the hoe carrying rod, as set forth.

In testimony whereof I hereunto affix my signature in the presence of two witnesses.

RAYMOND GRINDE.

Witnesses:
P. J. MURPHY,
ROBERT C. O'MALLEY.

Copies of this patent may be obtained for five cents each, by addressing the "Commissioner of Patents, Washington, D. C."